(12) United States Patent
Flach et al.

(10) Patent No.: US 6,537,625 B2
(45) Date of Patent: Mar. 25, 2003

(54) CONCENTRIC FINGER JOINTED TIMBER

(75) Inventors: Dwight Flach, Madison, WI (US); Roland Hernandez, Monona, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 49 days.

(21) Appl. No.: 09/877,377

(22) Filed: Jun. 8, 2001

(65) Prior Publication Data

US 2002/0015815 A1 Feb. 7, 2002

Related U.S. Application Data

(60) Provisional application No. 60/222,175, filed on Aug. 1, 2000, and provisional application No. 60/222,210, filed on Aug. 1, 2000.

(51) Int. Cl.[7] .................................................. B32B 1/02
(52) U.S. Cl. ........................ 428/34.1; 428/60; 403/332; 403/364
(58) Field of Search .......................... 428/60, 58, 34.1; 403/364, 332

(56) References Cited

U.S. PATENT DOCUMENTS 3,692,340 A * 9/1972 Roth ........................... 428/60
4,435,104 A * 3/1984 Held ........................... 403/364
4,800,938 A   1/1989 Coombs
5,409,214 A   4/1995 Cook
5,576,082 A  11/1996 Jarrett
5,584,328 A  12/1996 Grisley
5,711,356 A   1/1998 Grisley
5,985,415 A  11/1999 Giltner
6,041,837 A   3/2000 Hanson

* cited by examiner

Primary Examiner—Alexander S. Thomas
(74) Attorney, Agent, or Firm—M. Howard Silverstein; John D. Fado; Janet I. Stockhausen

(57) ABSTRACT

A finger joint for connecting first and second wooden segments includes intermeshing fingers that are concentrically disposed about the center of the end face of the two wooden segments. The fingers may either be independent round protrusions forming recesses therebetween operable to receive the fingers of a corresponding wooden segment to be joined, or may alternatively comprise a spiral shaped protrusion defining a corresponding recess sized to receive the spiral shaped protrusion of the corresponding wooden segment to be joined.

11 Claims, 2 Drawing Sheets

CONCENTRIC FINGER JOINTED TIMBER

CROSS-REFERENCE TO RELATED APPLICATIONS

This application claims priority to provisional patent application U.S. Serial No. 60/222,175, entitled "Small Diameter Concentric Finger Joint" and filed on Aug. 1, 2000, and further claims priority to provisional application U.S. Serial No. 60/222,210, entitled "Improved Finger-Joint in Finger Jointed Lumber" and filed on Aug. 1, 2000, the disclosures of which are hereby incorporated by reference as if set forth in their entirety herein.

BACKGROUND OF THE INVENTION

The present invention relates generally to jointed timber, and in particular, relates to concentric finger joints for end-joining joining two segments of timber.

When end-joining two segments of timber to produce a finished wooden product, it is desirable to produce a joint having sufficient strength and desirable aesthetic characteristics. Conventional end joints for timber include a plurality of fingers that extend outwardly from the end faces of the timber segments to be joined. In particular, the fingers may either extend linearly across the end face, or may be spaced from one another in both the first and second dimensions that define the face. The fingers are of equal length, and inter mesh such that the addition of adhesive within the joint bonds the two segments together. This type of joint is described, for example, in U.S. Pat. No. 5,985,415.

While such joints have been shown to be relatively effective for wood segments having a square or rectangular cross-section, their effectiveness is greatly reduced when joining timber segments having a round cross-section. For example, when traditional finger joints are used to join the rounded ends of two timber segments, poor strength characteristics have resulted, thereby facilitating premature failure of the joint. The deficiencies in bonding strength are exacerbated when joining two round timber segments having a relatively small diameter that inherently presents a reduced bonding surface area. Furthermore, conventional finger joints present a reduced bonding area near the outer periphery of the round cross-section, which is where the stresses experienced by the joint are typically greatest.

As a result, the weak bond that is produced by conventional finger joints applied to round wood segments is incapable of providing a reliable bond for low-grade timber. Accordingly, excess volumes of low-grade timber remain unharvested in the forest. This constitutes a waste of a potentially valuable resource, and additionally presents a greater potential for overly intense forest fires.

Furthermore, conventional finger joints applied to round cross-sectional pieces of timber produce jagged and aesthetically displeasing joint lines that are unsuitable for exposed finished products such as stair banisters and the like.

Therefore, what is needed is a joint for connecting two timber segments having a round cross-section that has improved strength characteristics, and produces an aesthetically appealing joint.

BRIEF SUMMARY OF THE INVENTION

The present invention recognizes that a concentric finger joint may be used to join timber segments having a round cross-section. In accordance with one aspect of the invention, a finger joint for connecting first and second wooden segments presenting first and second mating faces, respectively, comprises a first plurality of continuous protrusions extending from the first mating face defining a corresponding first plurality of recesses disposed therebetween, a second plurality of continuous protrusions extending from the second mating face defining a second plurality of recesses disposed therebetween sized to receive the first plurality of continuous fingers therein, wherein the second plurality of fingers is received by the first plurality of recesses, and an adhesive disposed within the joint operable to bond the first and second mating faces together.

This and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must be made therefore to the claims for this purpose.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
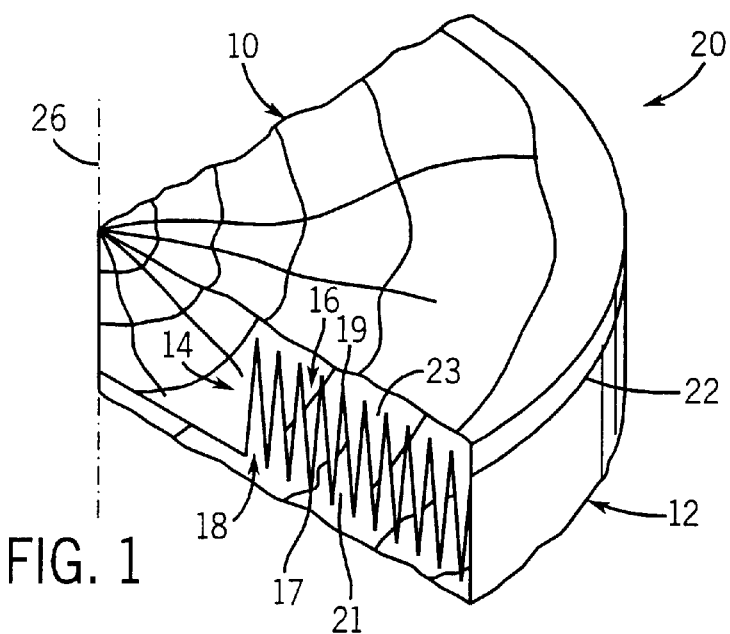
FIG. 1 is a partial perspective view of two segments of timber bonded via a concentric finger joint constructed in accordance with the preferred embodiment.

Referring initially to FIG. 1, first and second wooden segments 10 and 12 having intermeshing fingers 16 and 18 formed on their respective end faces are bonded to form a joint 14 of a unitary finished wooden product 20. The wood segments are solid and present a substantially round cross-section in accordance with the preferred embodiment, and are preferably circular. The joint 14 is formed by machining protrusions 17 and 19 into the end faces of wooden segments 10 and 12, respectively. The resulting fingers 16 and 18 are continuous members and concentrically disposed about center 26 of their respective end face. Because fingers 16 and 18 are concentrically disposed about the center of segments 10 and 12, respectively, they present a greater bonding surface at locations proximal the outer periphery of the segment, where stresses are known to be greatest in end-jointed timber. Accordingly, the strength of joint 14 is improved as compared to conventional finger joints used to end-join round timber segments. The concentric finger joint 14 may thus be used to join wooden segments of varying lengths, diameters, and mechanical properties, including lower-end timber that has previously been left unharvested due to poor strength characteristics.

Once the fingers 16 and 18 are produced, the two segments are then joined by placing a joining apparatus, such as an adhesive or mechanical fastener into the joint 14. If a liquid adhesive is used, the segments are held together under pressure while the adhesive is curing. Alternatively, a nail or screw or the like could join the two segments together. Advantageously, the visible interface between the first and second wooden segment 10 and 12 is a unitary, smooth linear joint line 22 that circumscribes the outer periphery of the wood product 20. This joint line is aesthetically desirable when compared to the jagged joint lines associated with prior art finger joints. Accordingly, the concentric finger joint 14 constructed in accordance with the preferred embodiment may be used to join wooden segments that comprise finished products, such as those used in the wooden furniture industry as well as the wood products/timber industry and the construction industry.

Figure 3:
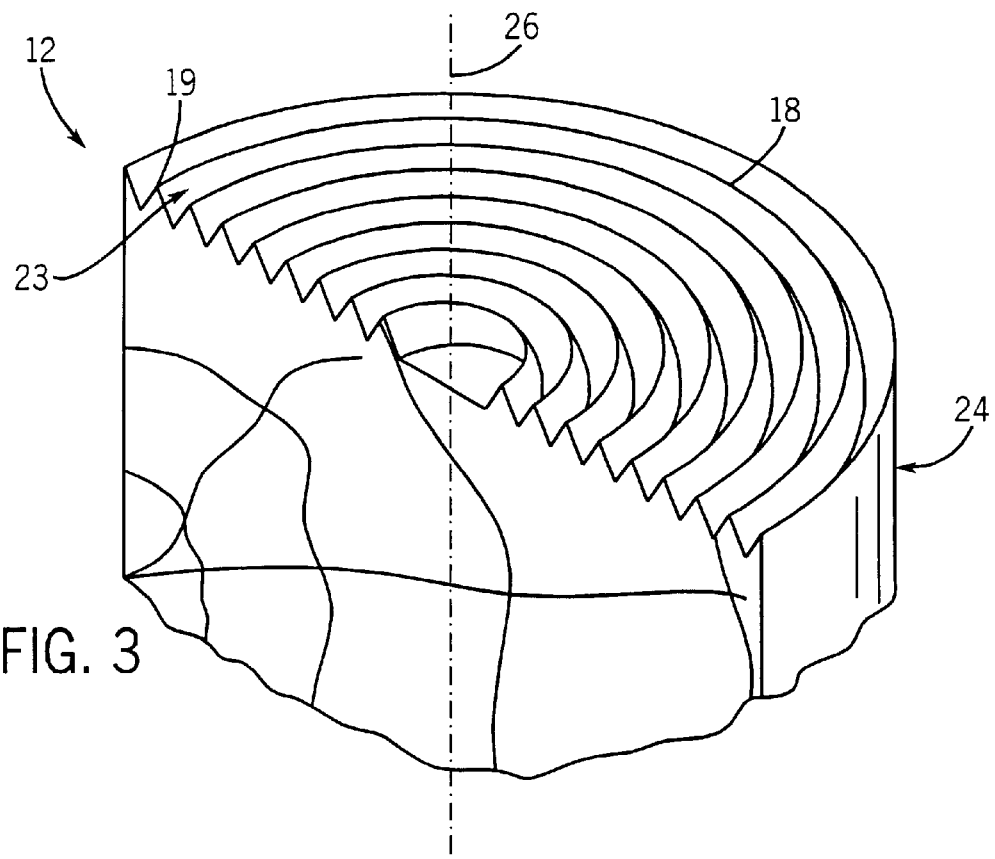
FIG. 3 is a partial perspective view of a timber segment having a concentric finger join disposed at its end face in accordance with the preferred embodiment.

As described above, mating fingers 16 and 18 are concentrically disposed about the center axis 26 of the wooden segment 12. In accordance with the preferred embodiment, the fingers 18 are triangular in cross-section, as illustrated in FIG. 3. It should be appreciated, however, that the fingers may assume any geometric configuration whatsoever that is capable of mating with a corresponding plurality of fingers disposed on the end face of a corresponding wooden segment. For example, the fingers 18 may be formed having a flat upper surface illustrated in FIG. 4, as will be described in more detail below. The fingers, which are machined on the end faces of round pieces of wood, provide a sufficient surface area to receive an adhesive and bond with the fingers of the mating wooden segment. Present testing suggests that an adequate bond is achieved when the fingers 18 have a length of approximately ⅝ of an inch. It should be appreciated, however, that this length may vary depending on the anticipated stress at the joint and/or the anticipated end use of the product. For example, if the unitary wooden member 20 is to be used for structural purposes, it may be desirable to increase the length of the fingers. Additionally, because the stresses experienced at the joint increase proportionally at greater distances from the center 26, it is often not necessary to produce fingers in the end faces at locations proximal the center.

It should be appreciated that both the cross-section of wooden segment 12 and fingers 18 are substantially circular, the present invention anticipates alternative geometric configurations. For example, the cross-section of wooden segment 12 may be oval shaped, or may assume an unconventional shape, so long as fingers 18 may be disposed substantially concentrically with respect to the centroid of the wooden segments. Additionally, while the fingers are shown as circular in FIG. 2, it should be appreciated that they may extend on the end face so as to assume various geometric configurations, such as an oval shape, so long as they are generally centrally disposed with respect to the centroid of the wooden segment 12.

Figure 2:
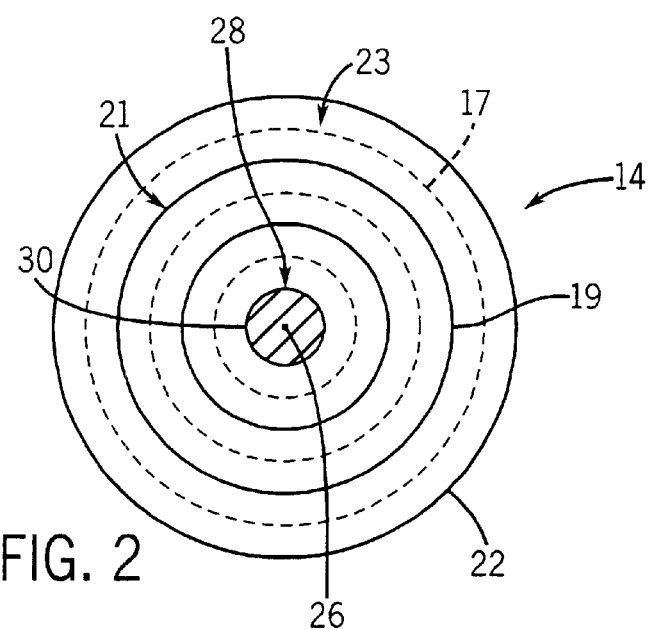
FIG. 2 is a sectional top plan view of the joint illustrated in FIG. 1.

Referring now to FIG. 2 in particular, joint 14 is formed by placing an adhesive between intermeshing fingers 16 and 18, as described above. In particular, protrusions 17 and 19 define corresponding recesses 23 and 21, respectively therebetween. The recesses disposed in each end face are sized to receive the fingers of the opposite end segment. The protrusions on each end face are thus radially spaced from one another such that the apex of each finger is aligned with the base of the corresponding recess of the timber segment to be joined. Accordingly, the fingers of one wooden segment are displaced with respect to the fingers on the corresponding wooden segment by a length equal to one-half the distance between adjacent protrusions. As a result, fingers 17 are aligned with the base of recess 23, and fingers 19 are aligned with the bottom of recess 21.

During the manufacturing of concentric fingers 17 and 19, it is desirable to implement a cutting machine having a plurality of concentrically disposed cutters thereon that will machine several, or all, fingers at one time. However, because the outer cutters will be traveling at a greater rate of speed than the inner cutters, they will be consequently be removing more material per unit time, and will be subject to greater wear. It may therefore be desirable to mount individual cutters on a series of co-centric rings, which rotate at different rates, thereby facilitating the relatively easy replacement of individual rings when necessary. To conserve resources and expense during manufacturing, it may not be necessary in some instances to machine fingers at locations proximal the center 26 of the end face as described above.

Figure 4:
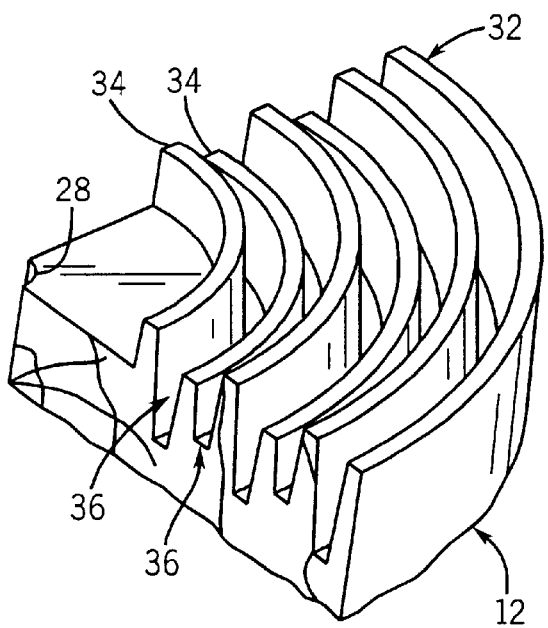
FIG. 4 is a partial perspective view of a timber segment having a concentric finger joint disposed at its end face having varying size fingers in accordance with an alternate embodiment of the invention.

Referring now to FIG. 4, the end face of wooden segment 12 is illustrated having a plurality of concentrically disposed fingers 32 constructed in accordance with an alternate embodiment of the invention. In particular, the outer tips 34 of each finger 32 are disposed at varying lengths with respect to adjacent fingers, thereby forming a staggered relationship. The corresponding grooves 36 disposed between adjacent fingers are thereby also staggered and sized to receive the staggered fingers of the opposite end face. As described above with reference to FIG. 2, segment 12 will present staggered protrusions that are radially offset from the corresponding fingers of an opposite end face by an amount of one-half the distance between adjacent fingers. It has been found that the staggered fingers 32 increase the strength of the resulting joint by reducing or eliminating stress concentrations that may be present in a joint having fingers of equal length.

Figure 5:
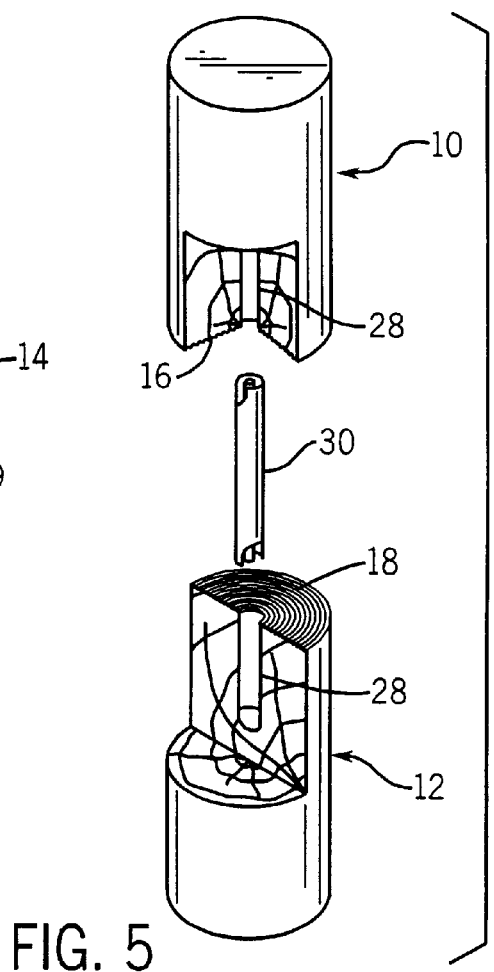
FIG. 5 is an exploded assembly view of a two timber segments joined via a concentric finger joint in combination with a dowel in accordance with an alternate embodiment of the invention.

Referring now to FIG. 5, a joint is illustrated having a reinforcement that may be implemented in accordance with the concentric finger joints constructed in accordance with the preferred embodiment. In particular, a support member 30, such as a dowel, is inserted into a pair of aligned cavities 28 that extend axially through the mating end faces. In particular, the cavities 28 are cylindrical and are centrally disposed in the end faces in accordance with the preferred embodiment. The cavities 28 are drilled or bored substantially perpendicularly to the end face, such that the cumulative length of cavities 28 is at least equal to the length of a support member 30 that is received therein. An adhesive is placed onto each end of member 30, or is inserted into both cavities 28 before inserting the member to reinforce the resulting joint.

Support member 30 may comprise a wooden dowel or steel bolt having an outer diameter no greater than the inner diameter of the cavity 28. The implementation of dowel 30 aids in alignment of the two wooden segments 10 and 12, and further adds strength and support for the joint 14. Present testing suggests that a dowel 30 having a diameter of ¾ of an inch, and a length of 10 inches should add an adequate amount of strength to the joint, though the size of the dowel may vary depending on the anticipated function of the fabricated wooden structure, as well as the diameter of the two wooden segments to be joined. It should be appreciated that the placement of the cavity 28 is not critical, so long as the cavities of corresponding wooden segments are properly aligned. The cavities 28 are centrally disposed in accordance with the preferred embodiment because, as described above, there is typically little need to machine fingers into the end face at this location. Support member 30 may alternatively comprise a screw having outer threads. In accordance with this alternate embodiment, the cavities are formed having inner threads operable to receive the threads of the support member. This would dispense with the need to use an adhesive to join the dowel 30 to the respective wood segments. It should be appreciated, however, that a wooden dowel may be preferable over a steel dowel bolt or screw if, for example, the fabricated wooden member 20 is to be further cut into individual segments after joining segments 12 and 14.

Figure 6:
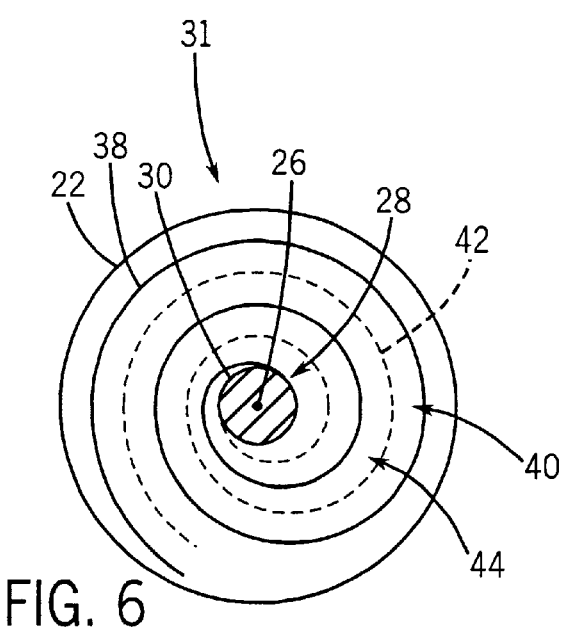
FIG. 6 is a top plan view of two timber segments joined via a concentric finger joint having spirally shaped fingers in accordance with an alternate embodiment of the invention.

Referring now to FIG. 6, a concentric finger joint 31 is illustrated in accordance with an alternate embodiment of the invention. In particular, each wood segment includes a single continuous spiral-shaped finger 38 and 42, respectively, that is concentrically disposed on its end face. Each pass of finger 38 and 42 is interposed between an adjacent recess 40 and 44, respectively. It should therefore be appreciated that fingers 38 and 42 produced a spiral having a pitch that is adequate to offset a pair of fingers a sufficient amount such that they intermesh when the end faces are joined. In particular, each spiral-shaped finger 38 and 42 are substantially centrally disposed in the recess formed in the end face of the opposite wood segment. This embodiment may be preferred, for example when it is desirable to implement a single cutter that travels along a predetermined spiral path. Because only one cutter is used to produce the spiral finger orientation, there will be no uneven wear of cutters during manufacturing, such as occurs when a plurality of concentrically disposed cutters are used, as described above. Additionally, as described above, the resulting joint line 22 is a straight and linear when the interface between the two joined wooden segments is viewed in cross section. The spiral-shaped fingers produce a stronger joint than conventional finger joints because the bonding surface area increases with increasing distances from the center 26. It should be further appreciated that a dowel 32 may further be implemented as described above in combination with this embodiment to further strengthen and align the two wooden segments to be joined.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention as set forth by the appended claims.

We claim:

1. A finger joint for connecting first and second wooden segments presenting first and second end faces, respectively, the joint comprising:

first and second aligned elongated cavities extending axially within the first and second wooden segments, respectively, and having an opening at their respective end faces, a first plurality of continuous protrusions extending from the first end face defining a corresponding first plurality of recesses disposed therebetween;

a second plurality of continuous protrusions extending from the second end face defining a second plurality of recesses disposed therebetween sized to receive the first plurality of continuous protrusions therein, wherein the second plurality of protrusions is received by the first plurality of recesses; and an adhesive disposed within the joint operable to bond the first and second end faces together.

2. The finger joint as recited in claim 1, further comprising a support member received within the first and second cavities.

3. The finger joint as recited in claim 2, wherein the support member is cylindrical.

4. The finger joint as recited in claim 3, wherein the support member is selected from the group consisting of a wooden, metal, ceramic, fiber-reinforced plastic, and cylindrical dowel.

5. The finger joint as recited in claim 4, wherein the dowel comprises a screw having threads that intermesh with mating threads disposed in the first and second cavities.

6. A finger joint for connecting first and second wooden segments presenting first and second end faces, respectively, the joint comprising:

a first spiral shaped protrusion extending outwardly from the first end face and defining a corresponding first spiral shaped recess in the first end face;

a second spiral shaped protrusion extending outwardly from the second end face and defining a corresponding second spiral shaped recess in the first end face sized to receive the first spiral shaped protrusion therein, and wherein the first recess is sized to receive the second protrusion therein; and an adhesive disposed within the joint and operable to bond the first and second mating faces together.

7. The finger joint as recited in claim 6, further comprising first and second aligned elongated cavities extending axially within the first and second wooden segments, respectively, and having an opening at their respective end faces.

8. The finger joint as recited in claim 7, further comprising a support member received within the first and second cavities.

9. The finger joint as recited in claim 8, wherein the support member is cylindrical.

10. The finger joint as recited in claim 9, wherein the support member is selected from the group consisting of a wooden, metal, ceramic, fiber-reinforced plastic, and cylindrical dowel.

11. The finger joint as recited in claim 10, wherein the dowel comprises a screw having threads that intermesh with mating threads disposed in the first and second cavities.

* * * * *